March 9, 1971 E. B. KILGORE 3,568,353
FISHING TACKLE RETRIEVER
Filed July 14, 1969 2 Sheets-Sheet 1
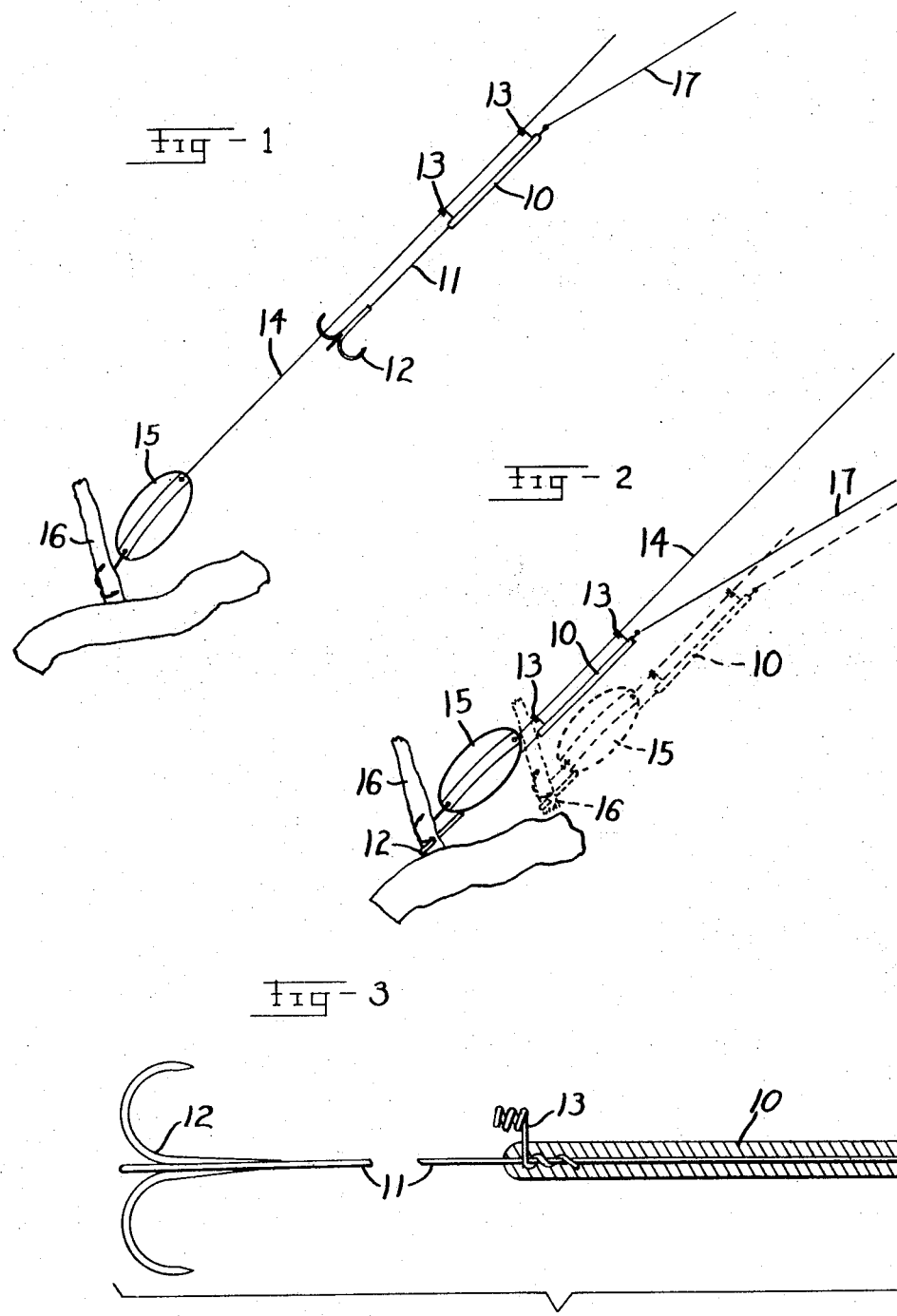
INVENTOR.
Earnest B. Kilgore
BY Wells & St. John
Attys March 9, 1971     E. B. KILGORE     3,568,353
FISHING TACKLE RETRIEVER
Filed July 14, 1969     2 Sheets-Sheet 2
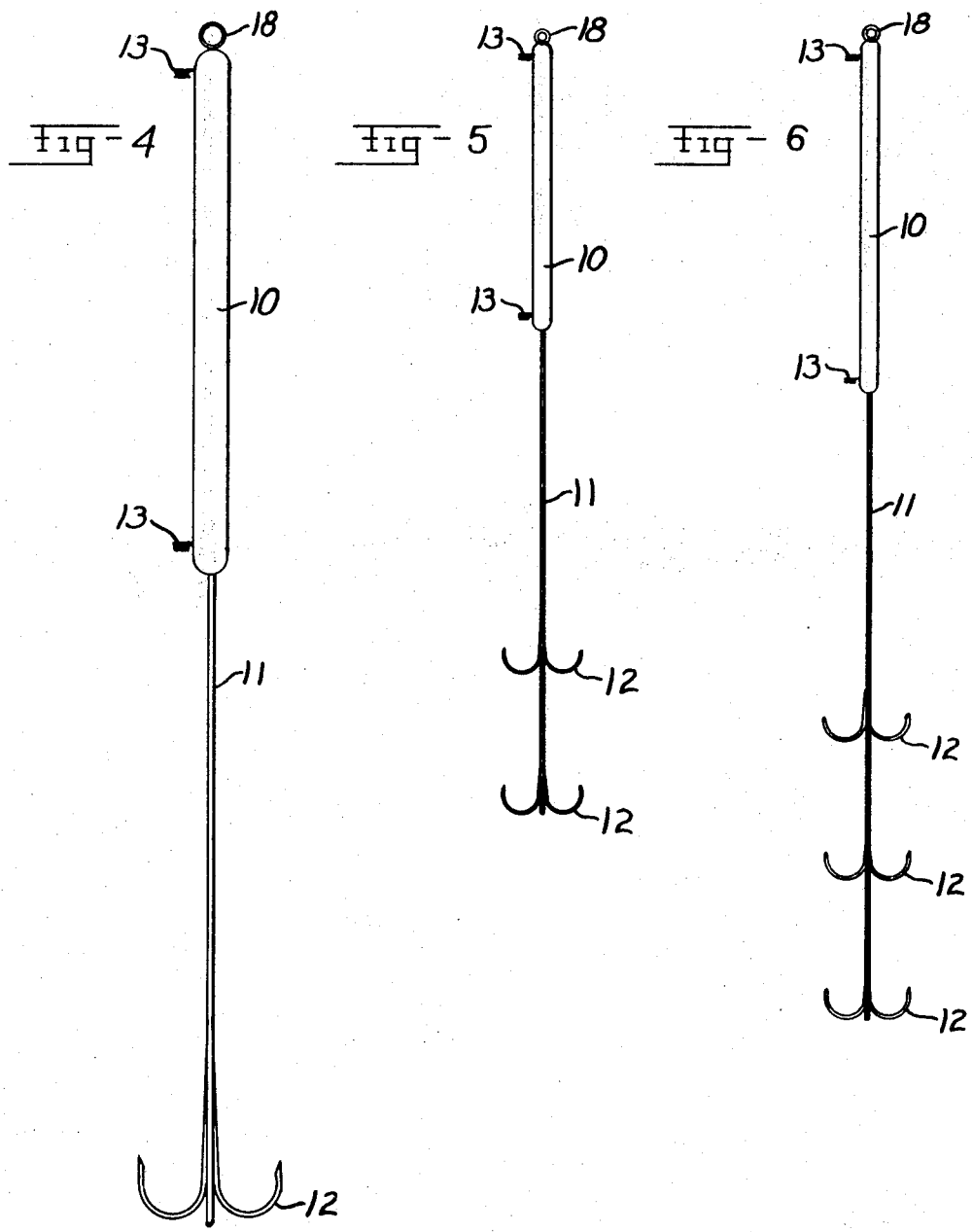
INVENTOR.
Earnest B. Kilgore
BY Wells & St. John
Attys

United States Patent Office 3,568,353
Patented Mar. 9, 1971

3,568,353
FISHING TACKLE RETRIEVER
Earnest B. Kilgore, 413 W. Ridge Road,
Moses Lake, Wash. 98837
Filed July 14, 1969, Ser. No. 841,366
Int. Cl. A01k 97/00
U.S. Cl. 43—17.2
8 Claims

ABSTRACT OF THE DISCLOSURE

A retrieving device for fishing tackle comprising an elongated weighted body supporting a protruding flexible wire having a hook mounted to its outer end. The body is provided with longitudinally-spaced guides for selective attachment to a fishing line.

BACKGROUND OF THE INVENTION

The device disclosed herein is directed to the solution of a problem common to almost all sports fishermen, namely the difficulty involved in retrieving lures which have become engaged with subsurface elements, such as fallen branches, weeds and rocks. The entanglement of fishing hooks and lures with such objects often results in the loss of the fishing tackle, since the supporting line will often break before release of the tackle. This becomes particularly discouraging in the case of the more expensive artificial lures which often are provided with multiple hooks that are very difficult to retrieve once they become so snagged.

Various devices have been previously proposed to resolve this difficulty. One such device is shown in the U.S. patent to Fifer, No. 2,765,567. This device comprises a weighted body having an apertured forward plate for engagement with hooks, etc. However, it relies upon the penetration of subsurface articles by the weighted body to engage the tackle, which often is impossible because of the dense nature of the material snagged by the lure. Another prior device is shown in the U.S. patent to Davis, No. 2,609,632. However, it uses a pair of forward extensions which themselves are subject to becoming entangled with material while the lure is being sought. Additional prior art structures are shown in the U.S. patents to Immell, No. 892,-730, Waltamath No. 2,443,061 and Koester No. 2,739,-404. In each of these devices the supporting weighted body itself must move to a position directly adjacent to or engaging the tackle being sought, posing serious difficulties with respect to penetration of weeds and branches.

To counter these difficulties and to permit maximum penetration of subsurface materials, I have devised a physically simple fishing tackle retriever having a rigid weighted body, a hook physically separated from the body and a supporting flexible length of wire. The entire apparatus is axially aligned to follow a taut fishing line to the snagged tackle. Considerable strength is provided in order to permit one to either lift the tackle itself or the article snagged. This structure has been found to permit maximum penetration of subsurface articles. It also provides adequate strength to insure retrieval of a lure.

SUMMARY OF THE INVENTION

The invention disclosed herein comprises the combination of an elongated rigid body of weighted material with first and second longitudinally spaced guides and a flexible shaft that protrudes outwardly from the body in axial alignment therewith. A hook is provided at the outer end of the flexible shaft. An attachment arrangement is provided at the opposite end of the body integrally with the shaft to secure the device to a strong supporting line.

It is one object of this invention to provide an independently controlled retriever or fishing tackle that is capable of penetrating weeds, branches and other subsurface articles to reach a snagged lure. The device is structured so that the rigid weighted body itself does not have to physically engaged the lure. A flexible extension is utilized to permit limited deflection of the retrieving hook in the area of the lure when necessary.

Another object of this invention is to provide a unitized structure having maximum strength and a direct connection between a strong retrieving line and a hook structure which is used to engage the lure or the materials snagged thereby.

Another object of this invention is to provide such a device which can be easily fabricated from existing materials and which can be produced and sold at a price easily justifiable by the saving in lures that result from its use.

BRIEF DESCRIPTION OF THE DRAWINGS

FIG. 1 is an elevation view illustrating the device in use;

FIG. 2 is an elevation view similar to FIG. 1, illustrating release of a snagged lure;

FIG. 3 is an enlarged sectional view taken axially through the retriever, with a portion of the flexible shaft being broken away;

FIG. 4 is a side elevation view of the device;

FIG. 5 is a reduced side elevation view of a second embodiment of the device; and FIG. 6 is a reduced side elevation view of a third embodiment of the device.

DESCRIPTION OF THE PREFERRED EMBODIMENT

The structure of a first embodiment of the retriever is illustrated in FIGS. 1–4 of the drawings. It essentially comprises a weighted body 10, a length of flexible wire 11, a hook 12 and two longitudinally-spaced guides 13. The coiled guides 13 are adapted to selectively receive a taut fishing line 14 leading to a lure 15 engaged with a surbsurface article such as a submerged branch 16. The retriever is controlled by a heavy retrieving line 17.

Taking the structure shown in FIG. 3 in greater detail, the body 10 is preferably molded of relatively heavy metal such as babbitt. It is formed in the shape of a cylinder having a uniform circular cross section along its length. It is elongated, being considerably greater in its length dimension than in its thickness. In a specific example of a proven structure the body is three and five eighths inches long and only one quarter inch in diameter. The overall length of the device is about nine inches.

Extending through the entire length of the body 10 is a stainless steel wire 11 that present an outwardly-protruding flexible shaft in axial alignment with the cylindrical body 10. The guides 13 each comprise circular cools having a supporting integral section that is wrapped about the central wire 11 within the molded body 10. I have found that the coiled portions of the guides 13 are best formed at about three sixteenths inch diameter, providing adequate freedom for movement of the fishing line within the guides and presenting minimum obstruction to movement of the retriever along the line.

At the end opposite to that which protrudes axially from body 10, the wire 11 is formed in a closed loop 18 to permit direct attachment of the wire 11 to a retrieving line 17. This direct attachment of wire 11 eliminates the possibility of breakage of the rigid weighted body under the strong tensile forces sometimes required to free the tackle being retrieved.

At its outer end, the shaft formed by wire 11 supports a treble hook 12. The hook 12 is preferably made of three barbless hooks, each having its shank secured to the central wire 11 so as to complete the axial alignment of the structure along the entire length of the retriever. While a conventional treble hook might be used, I have found it better to produce a hook centered on the wire 11 by use of three hooks which are equiangular with respect to one another. The base of these hooks can be filled as shown in FIG. 3, by soldering or other means, so that there is no wedged opening presented which might grip and hold the fishing line during downward movement of the retriever. As shown in FIG. 3, the separation between the various elements of hook 12 is such as to make it impossible to pinch or wedge the line between any two of the hook elements.

As shown in FIGS. 1 and 2, the apparatus is used to retrieve fishing takle such as lure 15, after the lure has engaged a submerged article such as the branch 16. The user can maintain the fishing line 14 in a taut condition without jeopardizing the lure 15, since no additional tensile force is required other than that necessary to keep the line 14 in a reasonably straight condition. The guides 13 are then attached to the line 14 for sliding movement. This is accomplished by working the line 14 through the coils so that the line is freely received within each guide 13. The body 10 will then be maintained in a closely proximate position parallel to the line 14. The weight of the body 10 will carry it downward along the line 14, and the heavy retrieving line 17 can be used to work the body 10 up and down as necessary to penetrate obstructions such as weeds, other branches etc.

As the retriever approaches lure 15, the flexible nature of the shaft formed by wire 11 will permit the hook 12 to deflect slightly to move around the lure 15 and any branches or articles closely adjacent to the tackle. This is extremely important at the time of engagement of the lure, since it is often entangled in such a fashion that a rigid element cannot penetrate closely enough to the lure to permit secure engagement of the lure or the article to which it is attached. With the present device, the flexible extension permits this penetration in a most effective manner and generally allows the hook 12 to reach the lure 15. Because of its tendency to maintain an aligned condition, wire 11 will cause hook 12 to become securely engaged to either the lure itself or the article that is held by the lure. As shown in FIG. 2, the hook 12 can engage a submerged branch 16 and adequate force can usually be applied through the line 17 directly to the wire 11 to break off the branch 16 so that it and the lure 15 can be pulled to the surface.

The hook 12 is barbless so that it can be moved in and out of position as necessary until the user can feel a secure engagement of hook 12 in such fashion that he can also detect freedom of movement of the lure 15 through the resulting slackness in line 14. The direct tensile connection between the strong line 17 and the strong wire 11 insures retrieval of the lures without the danger of fracture of the retriever upsetting the salvage operation.

The two embodiments of the device shown in FIGS. 5 and 6 are essentially similar to that shown in FIGS. 1–4, and identical reference numerals are used therein to indicate corresopnding structural elements. In FIG. 5 is shown a retriever having a pair of hooks 12 spaced longitudinally along the wire 11. In FIG. 6 is illustrated the use of three longitudinally-spaced hooks 12. The multiple hooks simply increase the chance of securing the retriever to release tackle and the use of these embodiments is otherwise identical to those steps described above.

I have produced these retrievers in a variety of sizes and weights, depending upon the intended use of the device for fresh or salt water fishing purposes. The body 10 has been produced in lengths of 3 5/8 inches to 5 inches, and could be either shorter or longer. Its diameter has ranged from 1/4 inch to 5/16 inch, and should permit maximum penetration along with required weight. There should be about 5 inches along wire 11 between body 10 and hook 12, with an additional 2 inches between the longitudinally spaced hooks. These dimensions are given only by way of example and may be varied with experience.

I have found that this retriever can be used to free any type of lure from any type of subsurface engagement. At times retrieval might require repositioning of the user to present a new angle of attack along the line 14, but it is always possible to retrieve the lure without endangering the relatively light fishing lines commonly used by sports fishermen today. The relatively high cost of artificial lures saved by its use fully justifies the expense of the retriever within a short period of time in the experience of almost any fisherman.

Having thus described my invention, I claim:
1. In a fishing tackle retriever:
   an elongated weighted body of substantially rigid material;
   first and second longitudinally spaced guides fixed along said body for detachably engaging a taut fishing line;
   a flexible shaft supported by and protruding outwardly from said body at one end thereof in axial alignment therewith;
   a hook having a shank mounted to the outer end of said shaft;
   and means at the remaining end of said body for securing the body to a retrieving line.
2. An apparatus as set out in claim 1 wherein said shaft extends along the entire length of the body and wherein said last-named means is formed integrally with said shaft.
3. An apparatus as set out in claim 2 wherein each of said first and second guides is fixed to said shaft within said body.
4. An apparatus as set out in claim 1 wherein said hook comprises a barbless treble hook.
5. An apparatus as set out in claim 1 wherein said body is formed of solid cast metal having a cylindrical shape and a constant cross section.
6. An apparatus as set out in claim 1 wherein the length of said body is approximately equal to the length of said shaft.
7. An apparatus as set out in claim 1 wherein the shaft comprises a length of spring steel wire; said hook comprising three barbless hooks having the respective shanks thereof secured outward in equiangularly spaced positions therefrom.
8. An apparatus as set out in claim 1 wherein there is provided a plurality of hooks mounted to said shaft in longitudinally spaced and aligned positions.

References Cited
UNITED STATES PATENTS

| | | | |
|---|---|---|---|
| 2,443,061 | 6/1948 | Waltamath | 43—17.2 |
| 2,594,120 | 4/1952 | Busher | 43—17.2 |
| 2,609,632 | 9/1952 | Davis | 43—17.2 |
| 2,800,738 | 7/1957 | Allman | 43—17.2 |
| 2,807,906 | 10/1957 | Mun | 43—17.2 |
| 3,010,240 | 11/1961 | Surcouf | 43—17.2 |

SAMUEL KOREN, Primary Examiner

D. J. LEACH, Assistant Examiner